(12) United States Patent
Hoke, Jr.

(10) Patent No.: US 7,797,244 B2
(45) Date of Patent: Sep. 14, 2010

(54) INTELLECTUAL PROPERTY ARCHIVE

(76) Inventor: Clare L. Hoke, Jr., 1318 N. Monte Vista Ave., Suite 11, Upland, CA (US) 91786

( * ) Notice: Subject to any disclaimer, the term of this patent is extended or adjusted under 35 U.S.C. 154(b) by 1555 days.

(21) Appl. No.: 10/713,282

(22) Filed: Nov. 15, 2003

(65) Prior Publication Data

US 2004/0122743 A1 Jun. 24, 2004

(51) Int. Cl.
*G06F 21/00* (2006.01)
(52) U.S. Cl. .............. 705/59; 705/50; 705/51; 705/52; 705/57
(58) Field of Classification Search .......... None
See application file for complete search history.

(56) References Cited

U.S. PATENT DOCUMENTS 5,375,240 A * 12/1994 Grundy ............... 726/28
5,629,980 A * 5/1997 Stefik et al. ............ 705/54
6,006,332 A * 12/1999 Rabne et al. ........... 726/6

OTHER PUBLICATIONS

Sabin, William A., "The Gregg Reference Manual," 9th ed., Glencoe McGraw-Hill; New York, New York, 2001, pp. 86-109.*

* cited by examiner

*Primary Examiner*—Andrew J. Fischer
*Assistant Examiner*—Joshua Murdough

(57) ABSTRACT

An Intellectual Property Archive (IPA) dedicated to archiving, verifying, referencing, gating, and consummating the transfers of digitized Intellectual and Copyrighted Properties within digital media. Said IPA containing the legal requirements of sale, transfer and proliferation of digitized Intellectual and Copyrighted Properties, and further providing Transaction Code Identifiers (TCI's), which serve to notify responsible third parties that transmissions within their domains contain digitized Intellectual and Copyrighted Properties, wherein said TCI's initiate protocols within said third party domains to inspect, halt, validate and transfer digitized Intellectual and Copyrighted Properties within said third party domains. Said TCI's being comprised of generic TCI's, which are human and machine readable, and Property Specific TCI's which are embedded, watermarked, associated and bundled with digitized Intellectual and Copyrighted Properties and contain the legal requirements of sale, transfer and proliferation of individual digitized Intellectual and Copyrighted Properties. Also, said responsible third parties verify content of transmissions within their respective domains against digitized Intellectual and Copyrighted Properties, and TCI's of record within the IPA. And said IPA inspecting digital transmissions of third parties within unsecured digital media, and transmissions submitted by responsible third parties to the IPA for assessment Said IPA also distributing digitized Intellectual and Copyrighted Properties in the interest of commerce and Property Rights Management.

4 Claims, 2 Drawing Sheets

---

Digitzed Transmission

| H E A D E R S | HEADER EXTENSION<br><br>PIP ADDRESS<br>PNP ADDRESS<br>PCP ADDRESS<br>P/SERVER ADDRESS<br>P/ROUTER ADDRESS | GENERIC<br><br>TCI | TEXT | PROPERTY SPECIFIC TRANSACTION CODE IDENTIFIER<br><br>DIGITIZED INTELLECTUAL /<br>INCLUDING THE LEGAL REQUIREMENTS OF SALE, TRANSFER AND PROLIFERATION<br><br>WITHIN DIGITAL MEDIA. PROPERTY SPECIFIC TCI INFORMATION, WATERMARKED<br><br>EMBEDDED, ASSOCIATED AND BUNDLED WITHIN DIGITIZED INTELLECTUAL/<br><br>COPYRIGHTED PROPERTY<br><br>COPYRIGHTED PROPERTY GENERIC TCI, AND ALSO PREFERRED INTERMEDIATE THIRD PARTY DESTINATION ADDRESSES, EMBEDDED, WATERMARKED, ASSOCIATED AND BUNDLED WITHIN DIGITIZED INTELLECTUAL / COPYRIGHTED PROPERTY SAID TCI INFORMATION, MACHINE READABLE TO THIRD PARTY IP'S, NP'S, CP'S, DCP'S, SERVERS, AND ROUTERS WITHIN TRANSMISSIONS |

FIGURE 2.

| H E A D E R S | HEADER EXTENSION<br><br>PIP ADDRESS<br>PNP ADDRESS<br>PCP ADDRESS<br>P/SERVER ADDRESS<br>P/ROUTER ADDRESS | GENERIC TCI | TEXT | PROPERTY SPECIFIC TRANSACTION CODE IDENTIFIER<br>DIGITIZED INTELLECTUAL /<br>INCLUDING THE LEGAL REQUIREMENTS OF SALE, TRANSFER AND PROLIFERATION<br><br>WITHIN DIGITAL MEDIA. PROPERTY SPECIFIC TCI INFORMATION, WATERMARKED<br><br>EMBEDDED, ASSOCIATED AND BUNDLED WITHIN DIGITIZED INTELLECTUAL/<br>COPYRIGHTED PROPERTY<br><br>COPYRIGHTED PROPERTY GENERIC TCI, AND ALSO PREFERRED INTERMEDIATE THIRD PARTY DESTINATION ADDRESSES, EMBEDDED, WATERMARKED, ASSOCIATED AND BUNDLED WITHIN DIGITIZED INTELLECTUAL / COPYRIGHTED PROPERTY SAID TCI INFORMATION, MACHINE READABLE TO THIRD PARTY IP'S, NP'S, CP'S, DCP'S, SERVERS, AND ROUTERS WITHIN TRANSMISSIONS |
|---|---|---|---|---|

Digitzed Transmission

INTELLECTUAL PROPERTY ARCHIVE

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC/REFERENCE TO "MICROFICHE APPENDIX"

NOT APPLICABLE

BACKGROUND OF THE INVENTION (1) Field of the Invention

The present invention represents a method of regulating e-commerce in the interest of protecting property such as information, art, performances or ideas which are Copyrighted, licensed, patented, industrial designs, or registered as trademarks. The present invention answers the need for a market based solution regarding the transfer, sale, and proliferation of Intellectual Properties within Digital Media. As novel methods of commerce develop and expand within the digital domain there arises a need to document not only Intellectual Properties themselves, but additional information which serves to distinguish Intellectual Property as novel within digital media. Information which distinguishes Intellectual Property as bound to restrictions with regard to sale, transfer, and proliferation, may be further associated with information intended to promote the legal sale, transfer, and proliferation of individual Intellectual and Copyrighted Properties. The present invention is herein presented in the interest of furthering commerce within digital mediums.

(2) Background Art

The world of electronic commerce and information distribution is developing rapidly to meet the needs of consumers, distributors and property holders while attempting at the same time to appear stable and secure The present invention provides a solution for the owners of property which may be traded in the world wide electronic marketplace. The concern of property owners involves receiving payment for the transfer of said property, when unaccounted copies of properties are being distributed from individual to individual. As the velocity of computing power increases into the future, the ability to detect and record transactions of property across the electronic medias will be readily enabled.

Consideration is currently being given to the issue of Trademarks within the Internet Community. "Governing" Internet organizations have recently begun to establish policies and processes for remedies regarding cybersquatters and piracy of Trademarks. Additional Top Level Domains (i.e. .com, .org, .net) are currently in preparation, and the effect of adding to, and subdividing the market of generic Top Level Domains (i.e. .athletes, .sports) is being considered in part as a remedy for Trademark conflicts. Issues regarding the remainder of Intellectual Property within digital medias; Patents, Industrial Designs, and Copyright need to be further addressed however, in the interest of promoting commerce.

The Present Invention is intended to further address information distribution and dissemination. Within the Internet, peer-to-peer distribution has led to the development of overlay networks. Currently, "smart" routers are being tested to assist with information processing, efficient delivery, and information distribution across nodal networks, for stability, scalability, and efficiency. The theory is being raised that the Internet may someday become the media, i.e.: distribution, storage, and processing. The Present Invention provides for improved information dissemination within several adaptive modules of Internet, media, and connectivity development.

BRIEF SUMMARY OF THE INVENTION

The present invention represents a solution with regards to accountability within digital medias. In its preferred embodiment the present invention delineates methods for improving commerce within the Internet and will prove to have implications in other digital media as well. The specifications of the Present Invention are intended to enable distributed nodal monitoring and verification of content, being transferred within digital medias. The business model included herein is intended to be illustrative, as the present invention will serve to enable expansive variations of commerce models and techniques.

In pending patent application Ser. No. 09/569,388 the author of the present invention suggests a first step in facilitating voluntary compliance with the laws of commerce within digital media requires the standardization of a Transaction Code Identifier (TCI), which shall serve to distinguish Intellectual Property as novel within digital medias. Quoting co pending application Ser. No. 09/569,388 page 3 line 6 . . . .

"Certain elements must be present for a transaction of property in the form of digital data files to be held accountable in the electronic realm. Such property must be identifiable via a particular coding to be recognized by Internet Providers, Network Providers and Internet servers world wide. Such a code could be in the form of a precursor, not unlike the universally recognized "http://" employed in the world wide web, or perhaps by property type, not unlike the .edu, .mil, .com, .org designations also employed in web addressing. Coding for the promotion of commerce in electronic media is herein referred to as a Transaction Code Identifier. Along with a Transaction Code Identifier further specific descriptors of the type of information contained in the file, the identity of the property owner, and the requirements to be agreed to by the recipient before the file is transferred may be bundled with the actual digital property file to make a Copyw, or bundle which may be transferred as a whole via electronic medias. In the process of making a transaction, further information must be transferred between parties. There must be information on the purchaser, a method of payment and further information to provide security for both the purchaser and the purchasee. Transaction coding may be in the form of imbedded coding, interlaced within the actual product so as to make it difficult to remove the transaction related information. It is herein suggested that Transaction Code Identifiers may be identified by the word or coding ".copyw" as in www.copyw/hitsong.com or www.hitsong/copyw/uspto.gov, but the actual term used is not as significant as its intended function, and the present invention should not be limited by such manner."

Pending patent application Ser. No. 09/569,388 illustrates several business models describing the use of generic and property specific Transaction Code Identifiers (TCI's) associated with, and or attached, and or bundled with an Intellectual Property such as a Copyright, and how such information may be employed to promote commerce in digital media. The preferred embodiment of the invention described in pending application Ser. No. 09/569,388 enables Intellectual Property to be transferred from multiple sources, retail, wholesale, and retail defacto distributors which include customers who are enabled by the invention to become distributors, (i.e. peer to peer distribution) based upon information associated with a particular Intellectual Property; while maintaining accountability to the property holder. However, the establishment of TCI's and the association of further information in the interest of commerce, is only the first step in establishing accountability within digital domains. For commerce to flourish, further methods of doing business are herein being delineated. The Present Invention is comprised of an Intellectual Property Archive (IPA), dedicated to archiving, verifying, referencing, gating, and consummating the transfers of Intellectual Properties and Transaction Code Identifiers within digital media. An Intellectual Property Archive may be comprised of commercial, academic, non-profit, governmental, corporate, and private concerns.

Property Specific TCI's contain the legal requirements of sale, transfer, ownership and proliferation of digitized Intellectual and Copyrighted properties, and are bundled, associated, watermarked, and embedded within Intellectual Properties. In the preferred embodiment of the Present Invention, there are also Generic TCI's. A TCI in the header of a transmission represents a generic Intellectual Property/Copyright notice which is human readable within the headers of digital transmissions. A generic TCI does not contain the details of the property title, who owns it, how much it costs, which account must be credited for when the property is transfer. This type of property specific information in the interest of digital commerce is what constitutes a property specific TCI, which is to be embedded, watermarked bundled, and associated with specific Intellectual and Copyrighted Properties by the Intellectual Property Archive (IPA). Both forms of TCI information are provided as a unique indication to responsible third parties, including: Internet Providers (IP's), Network Provider's (NP's), Connectivity Provider's (CP's), (such as phone, cel, cable, wireless, or satellite), Digital Content Provider's (DCP's), Servers, or Routers, and individuals; that to effect the lawful transfer of this information from party to party requires a transaction to occur. Therefore, generic TCI's are defined under the present invention as digital protocol flags to responsible third parties, autonomously informing said third parties that special processing must occur for this information to be legally transferred.

Similarly, Property Specific TCI's do more than contain the legal requirements of transfer of Intellectual Properties. Being of a similar, distinguishable format as generic TCI's, Property Specific TCI's may be machine readable as embedded within the content of Intellectual and Copyrighted properties. This distinction exists as precautionary measure against the eventuality of digital pirates removing generic TCI information from transmissions containing Intellectual Properties. Property specific TCI information is machine distinguishable as embedded and watermarked within Intellectual and Copyrighted properties, and human readable upon extraction from said Intellectual and Copyrighted properties. The Present Invention is designed to function within unsecured digital media, including the Internet. It is herein suggested that TCI information be utilized by third parties at their discretion. Should the generic TCI information be stripped from an Intellectual Property, it would require that a responsible third party, transferring said Intellectual Property through its domain, inspect the transmission in transfer through its domain. In the preferred embodiment of the Present Invention responsible third parties establish a policy that transmissions within the responsible third parties domain, be autonomously inspected for the presence of machine-readable TCI information.

If Generic machine readable TCI information is present within a transmission the responsible third party domain will 1) inspect the content of transmissions within its domain, 2) verify with the IPA that the TCI information matches the Intellectual Property, 3) gate the transmission of Intellectual and Copyrighted Property until the requirement of lawful transfer is met, 4) enable the transfer of Intellectual and Copyrighted Property including TCI information.

If a transmission is found to contain Property Specific machine readable TCI information the responsible third party domain will 1) inspect the content of transmissions within its domain, 2) replace the stripped generic TCI information within the transmission, as determined by consulting the IPA, so as to save processing time for the next domain the transmission will pass through, 3) gate the transmission of Intellectual and Copyrighted Property until the requirement of lawful transfer is met, 4) replace the generic TCI information and present the requirements of transfer as contained within the property specific TCI, as confirmed by verification with IPA, to the intended recipient of the transmission 5) enable the transfer of Intellectual and Copyrighted Property, including TCI information.

If a transmission does not contain any TCI information, the responsible third party domain will 1) sample a portion of the content of the transmission if the transmission is a) formatted in a manner common to Intellectual and Copyrighted Property, b) as a matter of statistical or random sampling, c) as a matter of domain policy to inspect all transmissions, 2) verify the sampled portion of the transmission with content within the IPA, 3) gate the transmission if the sampled portion contains all or part of a Intellectual or Copyrighted Property which requires a transaction to occur for legal transfer of said verified Intellectual or Copyrighted Property 4) replace the content of the transmission with a verified copy of the Intellectual or Copyrighted Property as supplied from the IPA, presenting the requirements of lawful transfer to the intended recipient, or forwarding the transmission to the next domain in the process of delivering the transmission to the intended recipient, 5) gate the Intellectual or Copyrighted Property content within the transmission, and request that the IPA forward a verified copy of the Intellectual or Copyrighted Property to the intended recipient.

As illustrated above, TCI's act as Internet Protocols to responsible third parties who elect to utilize TCI information. The presence of generic or embedded, associated, bundled and watermarked, Property Specific TCI's within a transmission provides autonomous gating, inspection, and verification, from responsible third party domains. In the preferred embodiment of the Present Invention, Generic and Property Specific TCI's also contain addresses of specific third party domains; and nodes of the IPA, whereby Intellectual and Copyrighted Properties will autonomously be provided preferential loose source routing of Intellectual and Copyrighted Properties in the interest of Property Rights Management. Herein, within the preferred embodiment of the Present Invention, preferential routing within the Internet may be autonomously provided Intellectual and Copyrighted Properties, by routers and third party domains within the Internet. As in the above example, responsible third parties may utilize TCI information being transferred within their domains, to place multiple intermediate responsible third party and IPA addresses and loose source routing protocols within the headers of digital transmissions containing Intellectual and Copyrighted Properties, as they are transferred through the domains of said responsible third parties. This preferential routing practice provides an additional layer of protection for the holders of Intellectual and Copyrighted Properties. Intellectual and Copyrighted properties which are distributed directly from the IPA, or a node of the IPA will also contain the addresses of preferential intermediate destinations, and loose source routing protocols or header extensions within transmissions.

TCI's may also be placed within the headers of transmissions of digitized Intellectual and Copyrighted Properties so as to further make Intellectual and Copyrighted Properties in transfer within digital media, recognizable to responsible third parties. Said third parties may include, but not be limited to, Internet Providers (IP's), Network Provider's (NP's), Connectivity Provider's (CP's), such as phone, cel, cable, wireless, or satellite), Digital Content Provider's (DCP's), Servers, Routers, corporations, individuals, and end user devices.

When files are uploaded to the domain of a responsible third party, as an e-mail attachment or FTP transfer, said responsible third party will scan the transmission for third party readable Transaction Code Identifiers. Upon uploading, or in preparation of downloading to an addressee, if a TCI is recognized, the responsible third party will gate the transmission until the requirements of transfer, as contained within the TCI are met by the intended recipient of the said transmission. If the transmission originates from a commercial source, the requirements of the transfer must also be met before commencing downloading. This arrangement places responsible third parties in the position of monitoring data that is being transmitted through their domains, in the interest of Property Rights Management.

IP's, NP's, CP's, DCP's, Server, and Routers, may autonomously inspect transmissions within their respective domains for TCI's and further; may choose to sample content suspected of containing pirated Intellectual and Copyrighted Property, against content contained within the IPA.

In a further embodiment of the present invention, after receiving indication that a properly formatted copy of an Intellectual and Copyrighted Property, is in position to be transferred within a third party IP, NP, CP, DCP, or Servers domain, the IP, NP, CP, DCP, or Server may then gate not only the transmission of the Intellectual and Copyrighted Property but the financial transaction as well; seeing that the conditions of the terms embedded or contained with the Intellectual and Copyrighted Property are met. The IP, NP, CP, DCP, or Server may then receive payment from the customer, further distributing each portion of the payment received to all interested parties; Intellectual and Copyrighted Property owner or distributor. In this embodiment of the present Invention the relationship of the IP, NP, CP, DCP, or Server to the consumer is expanded to include that an account and further compensatory responsibilities exist between the IP, NP, CP, DCP, or Server and the consumer doing business within the domain of the said particular IP, NP, CP, DCP, or Server In a further embodiment of the Present Invention, the third party IP, NP, CP, DCP or Server of the above example may elect to collect payment for the transfer, assess a small fee for due diligence, then transfer the remainder of the funds collected to the IPA, to have the IPA further disperse the funds, in accordance with TCI information of record.

It is herein suggested that interested parties, upon successfully being granted patent, or copyright status and protection, may seek to employ a TCI in association with their Intellectual Property for applications in digital media. A TCI distinguishes digital information as an Intellectual Property, and therefore unique and bound to restrictions with regard to transfer, ownership, and proliferation. Further information to be associated with, or embedded within an individual digital Intellectual Property may include: URL code(s), the name of the property holder, the name of the distributor, Trademark Information, the name of the property (song title), the name of the Publisher, descriptive text strings, requirements for purchase or transfer of ownership (or further resources if such transfer may not be accomplished directly over the Internet), product incentive information for further consumer/distributor dissemination, e-mail addresses, further computer information such as a program (applet or Java for example), return form and route for documentation of sale, the name of the Internet Servers and Web Providers involved in the transfer of the file, phone numbers, HTML document(s), the front end of a program such as Gopher, Internet domain name('s), the addresses of Web Servers, file type designations (audio), time/date code, FTP information, product update information, further artist information, artist tour dates and promotional material, pass words, music or property samples, warranty and service information, disclaimers, and accommodations for consumer feedback, in the interest of promoting commerce.

Clearly there currently exists a void with regard to registering Intellectual Property Identifiers and or associated information in a secure and referential manner. Given methods of business wherein multiple copies of Intellectual Property are in effect promoting their own multiplication, distribution, and disbursement, via peer-to-peer transfers, a referential database of comparative and iconological information associated with Intellectual Property needs to be established.

Accordingly, several objects and advantages of the present invention include:

(a) improved accountability of consumers to owners of Intellectual Properties.
(b) improved monitoring of transactions, which involve Intellectual Properties.
(c) a novel distribution structure, which promotes commerce.
(d) increased dissemination of the requirements of lawful transference of Intellectual Properties to consumers
(e) facilitation of multiple, or tiered distribution schedules of Intellectual Properties.
(f) a method for increasing consumer involvement in the proliferation of legally transferable Intellectual Properties.
(g) a method for expanding the market for individually distributed Intellectual Properties.
(h) novel protocols for Intellectual Properties.

BRIEF DESCRIPTION OF THE DRAWINGS

FIG. 2 represents TCI information and intermediate third party destination addressees within a digital transmission containing Intellectual and Copyrighted property.

DETAILED DESCRIPTION OF THE INVENTION

Figure 1:
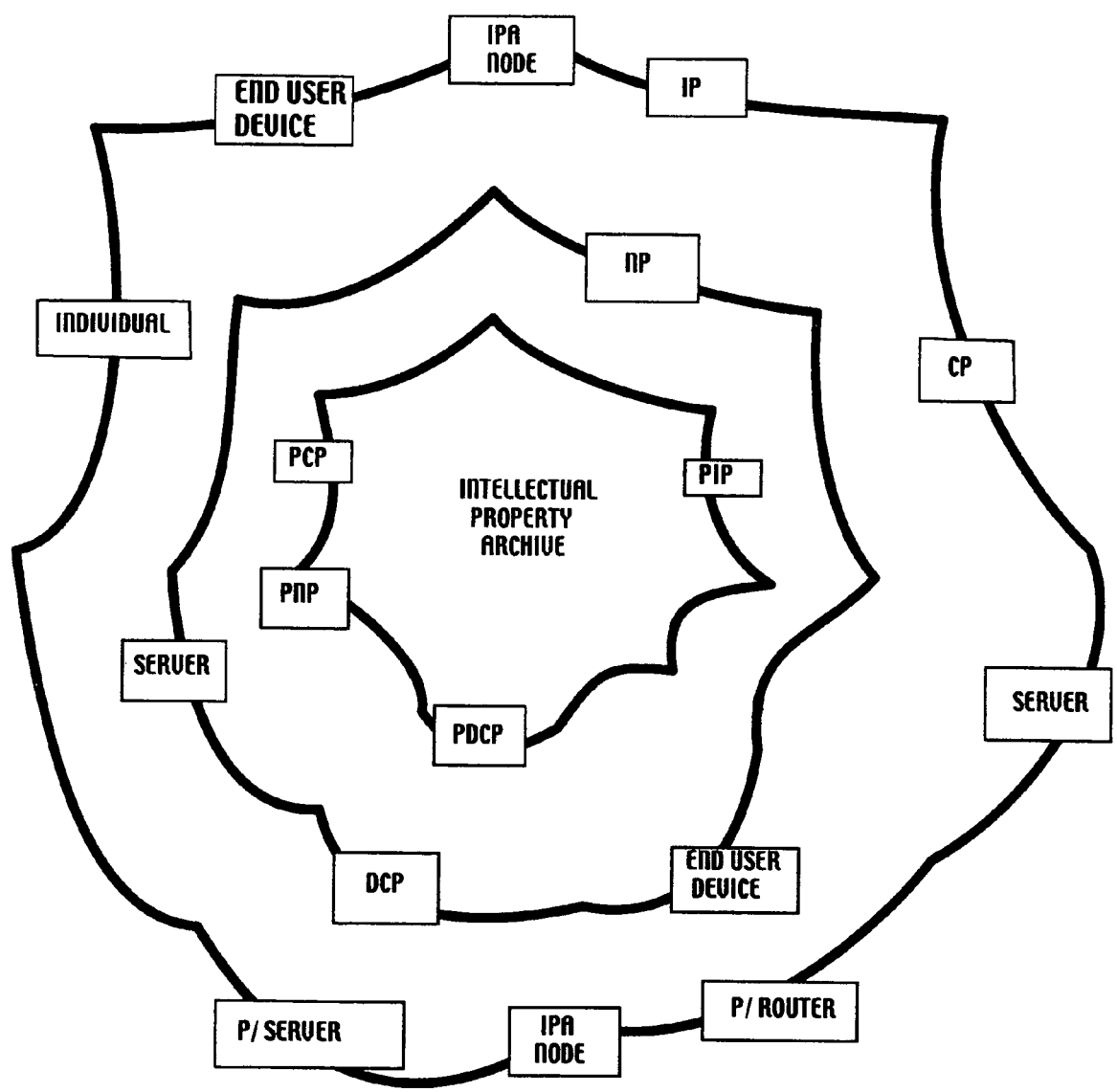
FIG. 1 illustrates responsible third parties inspecting transmissions with varying degrees of diligence, and accessing the Intellectual Property Archive and also, said Intellectual Property Archive nodaly inspecting third party transmissions.

The Present Invention is comprised of an Intellectual Property Archive (IPA), dedicated to archiving, verifying, referencing, gating, and consummating the transfers of Intellectual Properties within digital media.

The preferred embodiment of the present invention consists of a secured, physically dispersed and redundant system of Computers Servers, digital storage devices and Routers, attached, and or digitally connectable, to a backbone of the Internet. Holders of Intellectual Property who decide to employ the Present Invention are requested to submit copies of their Intellectual Property, proof of identification, and further contractual information to be associated with said Intellectual Property as a requirement of commerce to a Governing Body, which regulates said IPA. The IPA's Governing Body checks the validity of submitted information. Upon verification of the accuracy of submitted materials the Governing Body accepts, and enters the Intellectual Property, said Properties individual TCI generic TCI, and further required information into the IPA Generic and Property Specific TCI information shall be endorsed and associated with an individual Intellectual Property by the IPA's Governing Body. Further information may be associated with said Intellectual Property in the interest of promoting commerce. Said TCI's and associated information may be encoded, watermarked upon within or in some other fashion be made secure with a digitized Intellectual Property.

Intellectual Properties, generic and Property specific TCI's, and further information required for documentation and commerce shall be archived upon said IPA. There shall be firewalls, redundant checks and protection as would be understood by those versed in the art of Internet security, in place upon said IPA. Secure protocols will then be placed to enable said archived information to be referenced against Intellectual Property transfers from party to party upon the Internet. The IPA may be called upon by third party IP's, NP's, (CP's), (DCP's), Servers, Routers, Corporations, or Individuals, to insure that data, security, and legal requirements of sale, associated with a particular Intellectual Property have not been compromised.

Said Third party IP's, NP's, CP's, DCP's, Servers, and Routers may also inspect the content of transmissions within their respective domains to determine if said transmissions contain Intellectual and Copyrighted Properties which have been stripped of TCI's, by comparing content contained within said transmissions against content within the IPA. Inspection by Third party IP's, NP's, CP's, DCP's, Servers, and Routers against content that has been stripped of TCI's may be performed autonomously; as a matter of course, or may be employed for content with a high probability of containing Intellectual and Copyrighted Properties. Format of information may provide an indication that content has a reasonable expectation of containing Intellectual and Copyrighted Properties; for example MPEG, JPEG, or AVI formatted information will generally contain copyrighted material. Therefore third party IP's, NP's, CP's, DCP's, Servers, and Routers may autonomously access the IPA when certain formats are found within transmissions within their respective domains. ICP's (Intellectual and Copyrighted Property's) may be made recognizable to programs designed to identify ICP's against registered ICP's within the IPA.

Every Intellectual and Copyrighted Property is unique and is in itself a signature which is addressable within the domains of commerce, real and virtual, and may be recognizable both part and whole. If transmissions within the respective domains of Third party IP's, NP's, CP's, DCP's, Servers, and Routers are found to contain Intellectual, and Copyrighted, Properties, said third party IP's, NP's, CP's, DCP's, Servers, and Routers may gate the transmission, and forward information contained within TCI's as obtained from the IPA, to the intended recipient. Certain third party IP's, NP's, CP's, DCP's, Servers, and Routers may choose as a matter of policy to gate the transmission, and enable the IPA to become active with regard to the transmission; forwarding TCI information to the intended recipient, or forwarding the Intellectual and Copyrighted Property with TCI information embedded, watermarked, and associated information to the intended recipient.

It is apparent from the above delineations that responsible third parties may elect to incorporate several levels of due diligence in the interest of Property Rights Management. 1) Responsible third parties may insure that within their domains generic TCI's are scanned for, and said generic TCI's initiate protocols for special processing for Intellectual and Copyrighted Properties associated with said generic TCI's, gating transmissions and insuring that the legal requirements of sale and transfer have been fulfilled. 2) Responsible third parties may further inspect transmissions within their respective domains for Property Specific TCI's embedded and watermarked within the content of transmissions. 3) The above third parties may then further confirm that the property specific TCI information matches the associated Intellectual Property of the transmission as compared with the Intellectual Property of record within the IPA. 4) Responsible third parties may sample content of transmissions with no apparent TCI information, comparing the sample of transmission content, with content within the IPA: wherein content is itself unique, and distinguishable as Intellectual and Copyrighted Property, as compared with the content of record within the IPA.

In a further embodiment of the Present Invention the IPA consists of a dispersed network, providing international nodal access to content from consumers and distributors, and further, direct nodal inspection of traffic upon the Internet. Herein it is suggested that within this variation of the Present Invention, the IPA may actively inspect and gate transfers of digitized information, transmitted through nodes of the IPA's domain, as an aspect of the Internet framework. As stated earlier Intellectual and Copyrighted Properties may include multiple IPA addresses embedded and associated with said Intellectual and Copyrighted Property to be utilized as addresses for preferential loose source routing, on a global level.

The preferred embodiment of the Present Invention enables lawful distribution of Intellectual Properties from all interested parties: peers, end users, content distributors, content providers, third party IP's, NP's, CP's, DCP's, Servers, and Routers, and the IPA. As the Internet develops, third party IP's, NP's, CP's, DCP's, Servers, and Routers may elect to cache, as well as transfer and verify Intellectual Properties to assist with scalability and demand. In the above example, the described levels of due diligence will obviously be remunerated accordingly. Compensation for assistance with distribution will include increased traffic to particular domains via loose source routing and compensation for the level of diligence performed. The above examples of Intellectual and Copyrighted properties being embedded, watermarked, bundled and associated with specific addresses of intermediate destination third parties, for preferential loose source routing in the interest of Property Rights Management, also suggests that there will be established by due diligence, third party preferred: Internet Providers (PIP's), Network Providers (PNP's), Connectivity Providers (PCP's), Digital Content Providers (PDCP's), Servers (PS's), and Routers (PR's). In the preferred embodiment of the Present Invention, responsible third parties will act in their own best interest in providing Property Rights Management in the interest of property holders.

The IPA can be employed within the current Internet's existing framework. The preferred embodiment of the Present Invention would physically place the IPA on the Internet's current "Root A". It is herein suggested that the present invention shall establish an International depository and disseminator of Intellectual Property and commerce requirements there of world wide; a unique and valuable institution with novel methods of doing business.

The present applicant respectfully submits that many variations of the processes described in the present application are possible without straying from the spirit and benefits which may be associated with the present invention. The present invention may also give rise to techniques and protocols not delineated herein, which shall also be embraced within the scope of the present invention.

The invention claimed is:

1. A method of managing property rights of content through inclusion and enforcement of Transaction Code Identifiers (TCI's) and their licensing conditions over a network including a combination of at least three components from the group consisting of: internet providers, network providers, connectivity providers, digital content providers, servers, routers, and end user devices, as the content is distributed to a user, said method comprising:

A) placing a TCI in a header portion of a digital content file on an end user device of the network;
   wherein, the presence of the TCI indicates that the digital content file contains:
      copyright conditions; or
      other licensing conditions;
   wherein, the TCI comprises a generic section and a property specific section;
   wherein, the generic section comprises:
      human readable data which indicates that a transaction must occur in order to legally send the digital content file;
   wherein, the property specific section comprises machine readable data,
   wherein the machine readable data comprises:
      the title of the content;
      the owner of the content;
      the price of the content; and
      account information indicating where payments need to be sent;
B) watermarking the machine readable data within the TCI;
C) the owner of the content sending the machine readable data to a server for storage and later retrieval;
D) sending the digital content file containing the TCI from the owner to a first component of the network;
E) verifying, by the first component of the network, that the data in the property specific section of the TCI in the distributed digital content file has not been altered;
   wherein the verifying includes:
      i) retrieving, from the server, the data contained in the property specific section of the TCI sent by the owner; and
      ii) comparing the data retrieved from the server with the data in the property specific section of the TCI in the distributed digital content file to ensure they agree;
F) checking the server for payment information indicating that a user to which the digital content file is being distributed to has paid the indicated price to the account contained in the property specific section of the TCI;
G) requiring payment information, indicating the user's payment of the price to the account contained in the property specific section of the TCI, to be present on the server before the component will send the digital content file to a second component of the network;
H) sending the digital content file to the second component of the network;
I) if the second component is not a user device associated with the user:
      iii) the second component of the network repeating steps E), F), and G); and
      iv) sending the digital content file to a subsequent component of the network;
   if the second component is a user device associated with the user, storing the digital content file;
J) repeating step I) for each subsequent component until the digital content file is stored on the user device associated with the user.
   wherein, payment information is sent to the server for all payment transactions involving the distributed digital content file.

2. A method of managing property rights in accordance with claim 1 further comprising:
   watermarking the data within the generic section of the TCI,
   detecting, by a component of the network, one of said watermarked generic TCI data and watermarked property specific TCI data within said digital content file.

3. A method of managing property rights in accordance with claim 2 further comprising:
   verifying, by one of the at least three components of the network, that the data in the TCI of the digital content file is subject to property rights management.

4. A method of managing property rights in accordance with claim 1 further comprising:
   verifying, by one of the at least three components of network, that the data in the TCI of the digital content file is subject to property rights management.

* * * * *